United States Patent [19]
Balzer et al.

[11] Patent Number: 5,439,981
[45] Date of Patent: Aug. 8, 1995

[54] GRAFT POLYMERS, THEIR PREPARATION AND USE AS POUR POINT DEPRESSANTS AND FLOW IMPROVERS FOR CRUDE OILS, RESIDUAL OILS AND MIDDLE DISTILLATES

[75] Inventors: Juliane Balzer, Frankfurt; Michael Feustel, Kelkheim; Matthias Krull, Bad Soden; Werner Reimann, Oberhausen, all of Germany

[73] Assignee: Hoechst Aktiengesellschaft, Germany

[21] Appl. No.: 163,085

[22] Filed: Dec. 7, 1993

[30] Foreign Application Priority Data

Dec. 12, 1992 [DE] Germany ............ 42 41 948.4

[51] Int. Cl.$^6$ ............ C08F 255/02; C10M 143/02
[52] U.S. Cl. ............ 525/282; 525/293; 525/296; 525/302; 252/50
[58] Field of Search ............ 525/282, 293, 296, 302; 252/50

[56] References Cited

U.S. PATENT DOCUMENTS

| | | | |
|---|---|---|---|
| 4,985,048 | 1/1991 | Wintz | 44/394 |
| 5,143,960 | 9/1992 | Senuma et al. | 525/282 |
| 5,178,641 | 1/1993 | Konrad | 44/392 |
| 5,254,652 | 10/1993 | Reimann | 526/331 |

FOREIGN PATENT DOCUMENTS

| | | |
|---|---|---|
| 320766 | 6/1989 | European Pat. Off. |
| 446510 | 9/1991 | European Pat. Off. |
| 485773 | 5/1992 | European Pat. Off. |
| 4134347 | 6/1989 | Germany |
| 2207924 | 2/1989 | United Kingdom |

*Primary Examiner*—Vasu S. Janannathan
*Attorney, Agent, or Firm*—Jordan B. Bierman; Bierman and Muserlian

[57] ABSTRACT

Graft polymers which comprise 20 to 99.9% by weight of an ethylene copolymer (base polymer) and 0.1 to 80% by weight of a graft component. The base polymer includes 30% to 95% by weight of ethylene and (1) 5% to 70% by weight of vinyl esters of saturated aliphatic $C_2$- to $C_{18}$-monocarboxylic acids or (2) 4% to 50% by weight of vinyl esters of saturated aliphatic $C_2$- to $C_{18}$-monocarboxylic acids and 1% to 20% by weight of linear or branched $C_3$- to $C_{18}$-monoolefins. Graft components are N-substituted alpha,beta-unsaturated dicarboxylic acid imides, dicarboxylic acid amides, dicarboxylic acid half-amides, or ammonium salts of the half-amides. The graft polymers are employed for improving the flow properties of paraffin-containing mineral oils, mineral oil distillates, and middle distillates.

20 Claims, No Drawings

GRAFT POLYMERS, THEIR PREPARATION AND USE AS POUR POINT DEPRESSANTS AND FLOW IMPROVERS FOR CRUDE OILS, RESIDUAL OILS AND MIDDLE DISTILLATES

This Application claims the priority of German Application P 42 41 948.4, filed Dec. 12, 1992.

The invention relates to graft polymers of ethylene copolymers as the base polymers and N-substituted, alpha,beta-unsaturated dicarboxylic acid imides; N-substituted, alpha,beta-unsaturated dicarboxylic acid amides; N-substituted, alpha-beta-unsaturated dicarboxylic acid half-amides, ammonium salts of the half-amides; and mixtures thereof, as graft components; the method of preparation of the graft polymers; and their use as pour point depressants and flow improvers for crude oils, residual oils, and middle distillates, such as diesel fuel and grade EL fuel oil.

BACKGROUND OF THE INVENTION

Crude oils, residual oils, and middle distillates contain various amounts of n-paraffin, depending on their origin and method of production. Low temperatures reduce the solubility of these paraffins, which separate out as platelet-shaped crystals which can agglomerate and grow into one another in honeycomb fashion, sometimes including oil. The flow properties of the crude oils and crude oil products are thereby considerably impaired, so that problems may arise in their delivery, transportation, storage, and use.

The pour point (abbreviated PP; determined in accordance with DIN 51597) is an important applicational parameter for characterizing the flow and low temperature properties of crude and residual oils. The flow and low temperature properties of middle distillates are described by the cold filter plugging point (abbreviated CFPP; determined in accordance with DIN 51428). Both parameters are measured in °C.

It is known to add additives to mineral oils which modify the size and shape of the paraffin crystals and improve the low temperature properties of such oils, so that they remain flowable and filterable even at low temperatures. Pour point depressants are added to crude and residual oils to reduce the PP and flow improvers are added to middle distillates to reduce the CFPP. Oil-soluble copolymers of ethylene with other monomers have acquired great importance as pour point depressants and flow improvers.

Thus, according to DE-B-11 47 799, oil-soluble copolymers of ethylene and vinyl acetate having molecular weights between about 1,000 and 3,000 are added to petroleum distillates, engine fuels, or combustion fuel mixtures having a boiling range between about 120° and 400° C. Copolymers which comprise about 60% to 99% by weight of ethylene and about 1% to 40% by weight of vinyl acetate have proven to be particularly suitable.

The use of terpolymers containing at least 60% by weight of ethylene units, 1% to 40% by weight of alkenecarboxylic acid ester and/or vinyl ester units, and 1% to 30% by weight of vinyl ketone units having a molecular weight of 500 to 20,000, as additives for crude oils and middle distillates, is known from DE-A-32 47 753.

Terpolymers of ethylene having an average molecular weight of 500 to 10,000 are described as additives for crude and residual oils in U.S. Pat. No. 4,015 063. In addition to 45% to 80% by weight of ethylene, they comprise 10% to 30% by weight of a dialkylvinylcarbinol and 10% to 25% by weight of a fatty acid vinyl ester having up to 8 carbon atoms.

The use of terpolymers having an average molecular weight of 500 to 10,000 and comprising, in addition to ethylene, 0.5% to 20% by weight of diisobutylene and 20% to 35% by weight of vinyl acetate, as additives for mineral oils and mineral oil distillates, is known from EP-B-2 03 554.

EP-A-3 09 897 describes copolymers of 95% to 50% by weight of ethylene and 5% to 50% by weight of vinyl methoxyacetate having an average molecular weight of 500 to 10,000 and their use as flow improvers for middle distillates.

DE-A-40 42 206 relates to terpolymers which comprise, in addition to ethylene, 5% to 35% by weight of vinyl acetate and 1% to 25% by weight of vinyl neononanoate or vinyl neodecanoate and have an average molecular weight of 500 to 5,000. They are used as flow improvers, in particular for middle distillates.

Polymeric flow improvers for middle distillates, based on graft polymers which comprise 20% to 80% by weight of methacrylic acid esters of $C_8$- to $C_{15}$-alkanols and 80% to 20% by weight of ethylene/vinyl acetate copolymers having a degree of branching of 3 to 15 $CH_3$ groups per 100 $CH_2$ groups, are known from DE-A-37 25 059.

A disadvantage of the known pour point depressants and flow improvers is that their activity is not adequate for mineral oils and mineral oil distillates of particular origins and/or methods of production; for example, in middle distillates having final boiling points above 380° C., the cloud point is quite often significantly above 0° C. Furthermore, the use of conventional flow improvers can lead to impairment of the filterability of mineral oil distillates above the cloud point.

SUMMARY OF THE INVENTION

It is, therefore, an object of the present invention to develop other additives for improving the flow properties of those mineral oils and mineral oil distillates wherein the additives of the prior art are not active or are insufficiently so. Furthermore, the additives should guarantee adequate filterability of mineral oil distillates above the cloud point and be usable without problems.

This object is achieved by graft polymers which comprise 20% to 99.9% by weight of an ethylene copolymer and 0.1% to 80% by weight of a graft component. Particularly suitable flow improvers are graft polymers which comprise 50% to 99% by weight of ethylene copolymer (also called the base polymer) and 1% to 50% by weight of the graft component. The copolymer comprises 30% to 95% by weight of ethylene and (1) 5% to 70% by weight of vinyl esters of saturated, aliphatic $C_2$- to $C_{18}$-monocarboxylic acids or (2) 4% to 50% by weight of vinyl esters of saturated aliphatic $C_2$- to $C_{18}$-monocarboxylic acids and 1% to 20% by weight of linear or branched $C_3$- to $C_8$-monoolefins. The graft components are dicarboxylic acid imides, dicarboxylic acid amides, dicarboxylic acid half-amides, ammonium salts of the dicarboxylic acid half-amides, and mixtures thereof. All of the foregoing are N-substituted and alpha,beta unsaturated.

Surprisingly, the novel graft polymers, with particular effectiveness, improve the pour point of crude oils and residual oils, as well as the cold filter plugging point of middle distillates. It is to be emphasized that they are outstandingly soluble in mineral oils or mineral oil products and their addition does not impair the filterability of mineral oil distillates above the cold filter plugging point.

DETAILED DESCRIPTION OF THE INVENTION

Graft polymers in which the base polymer comprises 50% to 80% by weight of ethylene and 20% to 50% by weight of vinyl esters of saturated, aliphatic $C_2$- to $C_{18}$-monocarboxylic acids have proven to be particularly suitable. If a portion of the vinyl esters is replaced by olefins, ethylene copolymers which comprise 50% to 80% by weight of ethylene, 15% to 35% by weight of vinyl esters of saturated aliphatic $C_2$- to $C_{18}$-monocarboxylic acids, and 5% to 15% by weight of linear or branched $C_3$- to $C_{18}$-monoolefins, are preferred.

Preferable constituents of the base polymer are esters of vinyl alcohol with aliphatic $C_2$- to $C_{18}$-monocarboxylic acids, such as acetic acid, propionic acid, butyric acid, isononanoic acid, lauric acid or stearic acid, in particular acetic acid and $C_5$- to $C_{10}$-neocarboxylic acids. The term neocarboxylic acids (commercially available under the name Versatic acids) is to be understood as meaning saturated monocarboxylic acids having a tertiary carboxyl group. They can be prepared by the Koch synthesis, and the vinyl esters are obtained from them by reaction with acetylene. The vinyl esters can be employed as individual compounds or as mixtures of different compounds.

Linear or branched monoolefins which have proven suitable are alpha-olefins having 6 to 18 carbon atoms in the molecule, in particular diisobutylene. The olefins can also be employed as individual compounds or as a mixture.

Base polymers which comprise only ethylene and vinyl esters as comonomers are called copolymers in the context of the present invention, regardless of the number of different vinyl esters contained in the polymer. Ethylene copolymers which comprise, in addition to ethylene, two structurally different monomers, e.g. one or more vinyl esters and one or more alpha-olefins, are called terpolymers, regardless of the number of comonomers in the molecule.

Particularly suitable base polymers are, among the copolymers, ethylene/vinyl acetate copolymers having a vinyl acetate content of 5% to 50% by weight, preferably 20% to 40% by weight. Terpolymers of ethylene, with 5% to 50% by weight, preferably 20% to 35% by weight, of vinyl acetate, and 1% to 20% by weight, preferably 5% to 15% by weight, of vinyl ester of a $C_5$- to $C_{10}$-neocarboxylic acid and/or diisobutylene, are preferred.

The base polymers have an average molecular weight ($M_n$) of 500 to 30,000. Graft polymers of the base polymers having an average molecular weight of 8,000 to 30,000 are preferred as pour point depressants and graft polymers of the base polymers having an average molecular weight of 1,000 to 10,000 are preferred as flow improvers. The average molecular weights mentioned are determined by gel permeation chromatography (with polystyrene calibration). A description of the determination method is to be found, for example, in Ullmanns Encyclopädie der technischen Chemie (Ullmann's Encyclopedia of Industrial Chemistry), 4th Edition (1978), Volume 15, page 389 et seq.

Graft polymers which are particularly suitable as flow improvers have a melt viscosity of 50 to 500 mPa.s at 140° C. (measured with a plate/cone rotary viscometer model PK 100 from Haake). The melt flow index (in accordance with DIN 53 735) of the graft polymers preferably employed as pour point depressants is 50 to 5,000 g/10 minutes, measured at 190° C. under a load of 2.16 kg ($MFI_{190/2.16}$).

The base polymers can be polymerized from their monomers by known processes in the presence of free radical initiators such as oxygen, peroxides, hydroperoxides, or azo compounds, and molecular weight regulators, such as hydrocarbons, aldehydes, or ketones, in autoclaves or tube reactors (in this context, cf., for example, Ullmanns Encyclopädie der technischen Chemie (Ullmann's Encyclopedia of Industrial Chemistry), 4th Edition, Volume 19, pages 169 to 178). The preparation can be carried out in suitable inert organic solvents as the reaction medium. The polymerization is advantageously carried out in bulk under pressure of between 150 and 300 MPa at temperatures between 120° and 325° C. without using solvents as the reaction medium but, if appropriate, they are used in very small amounts as auxiliaries for metering in the initiator and the molecular weight regulator.

Dicarboxylic acid imides, diamides, half-amides, ammonium salts of the half-amides, or mixtures thereof, all of which are N-substituted and alpha,beta-unsaturated, are used according to the invention as graft components. For their preparation, alpha-beta-unsaturated dicarboxylic acids or anhydrides are reacted with an amine. The reaction can be carried out in an aliphatic or an aromatic solvent. Examples of aliphatic solvents are hexane, heptane, cyclohexane, or kerosene, i.e. a mixture of higher aliphatic hydrocarbons. Suitable aromatic solvents are, for example, toluene, xylene, or mixtures of aromatic hydrocarbons. The addition of an acid catalyst, such as p-toluenesulfonic acid, and continuous removal of the water formed during the reaction have also proven appropriate, as has maintaining reaction temperature of between 100° and 180° C. The progress of the reaction can be monitored by measuring the acid number or by IR spectroscopy.

Maleic acid, fumaric acid, and, preferably, maleic anhydride have proven to be particularly suitable as the alpha-beta-unsaturated dicarboxylic acids or anhydrides. Primary and/or secondary amines of the general formula $H_2NR^1$ or $HNR^1R^2$, in which $R^1$ and $R^2$ are the same or different, alkyl, cycloalkyl, aryl, or arylalkyl radicals are used for the preparation of graft components; $C_4$- to $C_{20}$-monoalkylamines and/or benzylamine are preferable.

The graft polymers according to the invention are prepared by processes which are known per se; cf. in this context, for example, Houben-Weyl, Methoden der organischen Chemie (Methods of Organic Chemistry), Volume 14/1, page 110 et seq. It has proven particularly appropriate to react the base polymer and graft component in the presence of a free radical initiator at temperatures of 30° to 200° C. under an inert gas, such as argon, nitrogen, or carbon dioxide. The reaction can be carried out either as a bulk reaction in the absence of solvents constituting the reaction medium (excluding the small amounts of solvents for metering in the initiator), or in the presence of solvents. Suitable solvents are aliphatic and aromatic hydrocarbons, such as decane, kerosene, toluene, xylene, ethylbenzene, cumene, trimethylbenzene, and dimethylnaphthalene. Commercially available mixtures of aliphatic or aromatic hydrocarbons having a boiling range of between 150° and 210° C. are likewise suitable. In addition, possible solvents are benzene derivatives, such as chlorobenzene, dichlorobenzene, and nitrobenzene. The free radical initiators employed are the classes of compounds usually used for this purpose, for example peroxides, hydroperoxides, esters of peroxy acids, and azo compounds. Examples are di-t-butyl peroxide, t-butyl hydroperoxide, dilauroyl peroxide, t-butyl perneodecanoate, t-butyl peroxy-2-ethylhexanoate, t-butyl peroxypivalate, and azo-bis-isobutylronitrile. The initiators are in general metered into the mixture in amounts of 0.1% to 5% by weight, based on the reactants. The reaction time is about 1 to 24 hours, depending on the dissociation time of the free radical initiator employed and the reaction temperature. Homopolymers can also be formed to a minor extent from the graft component. They do not impair the properties of the graft polymer and therefore do not have to be removed.

As has already been stated, the novel graft polymers have proven to be outstandingly suitable for improving the flow properties of mineral oils and mineral oil distillates. Accordingly, they can be employed with equal success as pour point depressants in crude and residual oils and as flow improvers in middle distillates, such as diesel fuel and grade EL fuel oil.

The graft polymers according to the invention are added to mineral oil distillates, such as crude oils, residual oils, or middle distillates, in bulk, as a dispersion, or as a solution. Suitable dispersants/solvents are aliphatic or aromatic hydrocarbons or hydrocarbon mixtures, such as gasoline fractions, in particular kerosene. The concentration of the polymers in the mineral oils or mineral oil distillates is 0.001% to 2% by weight, preferably 0.005% to 0.5% by weight, based on the mineral oil or the mineral oil distillate. The graft polymer can be used by itself or together with other additives, for example with dewaxing auxiliaries, corrosion inhibitors, antioxidants, or sludge inhibitors. It is also possible to employ mixtures of the graft polymers according to the invention in which the constituents differ in respect of their composition and/or their average molecular weight.

The following examples illustrate the invention without limiting it.

In the examples, VA is used as an abbreviation for vinyl acetate and VEOVA is used as an abbreviation for $C_9$- and $C_{10}$-neocarboxylic acid vinyl esters.

The content of vinyl esters of acetic acid, neononanoic acid, or neodecanoic acid is determined by pyrolysis of the polymer at 450° C. in a closed system. The acetic acid, as a cleavage product of vinyl acetate, is extracted from the residue by shaking several times with hot water. The acetic acid is determined in the combined aqueous phases by reaction with $NaI/KIO_3$ solution and titration of the iodine liberated with $Na_2S_2O_3$ solution. Neononanoic acid and neodecanoic acid are extracted from the residue several times with toluene and, after the toluene phases have been combined and 2-propanol has been added, are titrated with a solution of KOH in ethanol (0.1 mol of KOH/liter of solution).

The K value, also called the intrinsic viscosity, was measured in an Ubbelohde viscometer at 25° C. using a 5% by weight solution of the polymer in toluene.

A) Preparation of the Graft Polymers

Example 1

A solution of 24 g of an ethylene/vinyl acetate copolymer (polymer 1) and 5 g of stearylmaleimide in 26 g of kerosene is heated to 100° C. under a nitrogen atmosphere. A mixture of 1 g of t-butyl peroctanoate dissolved in 5 g of kerosene is added dropwise to this solution over a period of 1 hour, while stirring. When the addition is complete, the mixture is allowed to after-react at 100° C. for 10 hours.

Example 2

24 g of an ethylene/vinyl acetate/diisobutylene terpolymer (polymer 2) are reacted with 5 g of stearylimide under the conditions of Example 1.

Example 3

A solution of 29 g of an ethylene/vinyl acetate copolymer (polymer 3) and 5.8 g of n-stearylmaleimide in 26 g of kerosene is heated to 100° C. under a nitrogen atmosphere. A mixture of 2 g of t-butyl peroctanoate dissolved in kerosene is added dropwise to the solution over a period of 1 hour, while stirring. When the addition is complete, the mixture is allowed to after-react at 100° C. for 10 hours.

Example 4

A solution of 95 g of an ethylene/vinyl acetate copolymer (polymer 4) and 7.2 g of n-octadecylmaleimide (70% strength by weight in toluene) in 56 g of toluene is heated to 90° C. while stirring slowly and passing through a stream of nitrogen; a solution of 1 g of t-butyl peroxy-2-ethylhexanoate in 40 g of toluene is then added continuously over the course of 2 hours. The mixture is subsequently stirred at 90° C. for a further 2 hours.

Example 5

Example 4 is repeated using 1.4 g of n-dodecylmaleimide (70% strength in toluene) as the graft component.

Example 6

Example 4 is repeated using 7.2 g of n-dodecylmaleimide (70% strength in toluene) as the graft component.

Example 7

Example 4 is repeated using 2.9 g of n-dodecylmaleimide (70% strength in toluene) as the graft component.

Example 8

142.5 g of an ethylene/vinyl acetate copolymer (polymer 4), 7.5 g of n-dodecylmaleimide, and 0.75 g of t-butylperoxy-2-ethylhexanoate are stirred at 90° C. for 4 hours while passing through a stream of nitrogen.

Example 9

Example 8 is repeated using 0.75 g of dibenzoyl peroxide instead of t-butyl peroxy-2-ethylhexanoate as the initiator.

Example 10

Example 8 is repeated using 0.75 g of dilauroyl peroxide instead of t-butyl peroxy-2-ethylhexanoate as the initiator.

Example 11

Example 8 is repeated using 0.75 g of t-butyl peroxypivalate instead of t-butyl peroxy-2-ethylhexanoate as the initiator.

Example 12

Example 8 is repeated using t-butyl perneodecanoate instead of t-butyl peroxy-2-ethylhexanoate as the initiator.

Example 13

Example 8 is repeated using 142.5 g of an ethylene/vinyl acetate/vinyl neodecanoate terpolymer as the base polymer.

The properties of the base polymers used in Examples 1 to 13 are summarized in Table 1 and the properties of the graft polymers are summarized in Table 2.

TABLE 1

| Characterization of the base polymers | |
|---|---|
| Polymer 1: | Ethylene/vinyl acetate copolymer (VA content: 28.8% by weight; $V_{140}$: 320 mPa · s) |
| Polymer 2: | Ethylene/vinyl acetate/diisobutylene terpolymer (VA content 24.4% by weight; diisobutylene content: 9.8% by weight; $V_{140}$: 345 mPa · s) |
| Polymer 3: | Ethylene/vinyl acetate copolymer (VA content 25.8% by weight; $MFI_{180/2.16}$: 637 g/10 minutes) |
| Polymer 4: | Ethylene/vinyl acetate copolymer (VA content 31.2% by weight; $V_{140}$: 110 mPa · s) |
| Polymer 5: | Ethylene/vinyl acetate/vinyl neononanoate terpolymer (VA content: 28.8; vinyl neononanoate content: 5.6% by weight; $V_{140}$ : 100 mPa · s) |

TABLE 2

| Characterization of the graft polymers | | | | | |
|---|---|---|---|---|---|
| Example No. | VA content (% by weight) | VEOVA content (% by weight) | MFI (g/10 minutes) | V140 (mPa · s) | Mn (g/mol) | K value |
| 1 | 22.8 | — | — | 270 | — | — |
| 2 | 20.5 | — | — | 375 | — | 19.0 |
| 3 | 22.1 | — | 1,120 | — | — | — |
| 4 | 29.1 | — | — | 145 | 3,162 | 19.0 |
| 5 | 30.5 | — | — | 123 | 2,808 | 19.4 |
| 6 | 29.3 | — | — | 130 | 2,731 | 19.5 |
| 7 | 30.9 | — | — | 95 | — | 19.6 |
| 8 | 28.9 | — | — | 120 | — | 19.2 |
| 9 | 29.5 | — | — | 134 | — | 19.6 |
| 10 | 30.1 | — | — | 101 | — | 19.4 |
| 11 | 29.1 | — | — | 125 | — | 18.9 |
| 12 | 29.9 | — | — | 129 | — | 19.1 |
| 13 | 26.9 | 5.1 | — | 95 | — | 19.3 |

B) Activity of the Graft Polymers According to the Invention

A residual oil and 7 middle distillates to which the graft polymers are added as a 50% by weight dispersion in kerosene are employed for testing the activity of the graft polymers according to the invention. The test oils employed are summarized in Table 3.

TABLE 3

| Test oils | |
|---|---|
| MD 1 | Masut residual oil from Russia |
| MD 2 | VEBA grade EL fuel oil/Scholven No. 51 |
| MD 3 | VEBA grade EL fuel oil/Scholven No. 50 |
| MD 4 | VEBA grade EL fuel oil/Horst No. 113 |
| MD 5 | Total middle distillate type 7542 |
| MD 6 | VEBA diesel fuel No. 3 |
| MD 7 | Raw diesel |
| MD 8 | VEBA diesel fuel/Horst |

In Table 4, Example 15, the activity of the graft polymer obtained according to Example 3 as a pour point depressant (PPD action) is compared with that of a non-grafted ethylene copolymer (polymer 3) (Example 14).

TABLE 4

| PPD action of the graft polymers (°C.) | | |
|---|---|---|
| Example No. | Polymer | MD 1 (+3.3)* 300 ppm |
| 14 | Polymer 3 | −18.8 |
| 15 | Graft polymer according to Example 3 | −21.7 |

*base pour point

The activities of the graft polymers obtained according to Examples 1 to 13 as flow improvers (CFPP action) are described in Table 5 (Examples 20 to 31) in comparison with non-grafted ethylene copolymers—polymers 1, 2, 4, and 5 (Examples 16 to 19).

TABLE 5

| | | CFPP action of the graft polymers (°C.) | | | | | | | | |
|---|---|---|---|---|---|---|---|---|---|---|
| | | MD 2 (±0)* | | MD 3 (+1)* | | MD 4 (+1)* | | MD 5 (+3)* | MD 6 (−11)* | MD 7 (−10)* | MD 8 (−10)* |
| Example No. | | 200 ppm | 400 ppm | 200 ppm | | 200 ppm | 400 ppm | 500 ppm | 200 ppm | 200 ppm | 400 ppm |
| | Polymer | | | | | | | | | | |
| 16 | 1 | −3 | −4 | ±0 | | ±0 | −1 | — | — | — | — |
| 17 | 2 | −5 | −7 | −1 | | −2 | −1 | — | — | — | — |
| 18 | 4 | — | — | — | | — | — | +1 | −23 | −27 | −21 |
| 19 | 5 | — | — | — | | — | — | — | — | −20 | −16 |
| | graft polymer according to Example: | | | | | | | | | | |
| 20 | 1 | −13 | −15 | −15 | | −17 | −17 | — | — | — | — |
| 21 | 2 | −10 | −15 | −1 | | −4 | −13 | — | — | — | — |
| 22 | 4 | — | — | — | | — | — | +1 | −26 | — | −17 |
| 23 | 5 | — | — | — | | — | — | −1 | −27 | — | −14 |
| 24 | 6 | — | — | — | | — | — | −2 | −26 | — | −15 |
| 25 | 7 | — | — | — | | — | — | — | — | −28 | −18 |
| 26 | 8 | — | — | — | | — | — | — | — | −23 | −25 |
| 27 | 9 | — | — | — | | — | — | — | — | −29 | −26 |

TABLE 5-continued

| | | CFPP action of the graft polymers (°C.) | | | | | | | |
|---|---|---|---|---|---|---|---|---|---|
| | | MD 2 (±0)* | | MD 3 (+1)* | MD 4 (+1)* | | MD 5 (+3)* | MD 6 (−11)* | MD 7 (−10)* | MD 8 (−10)* |
| Example No. | | 200 ppm | 400 ppm | 200 ppm | 200 ppm | 400 ppm | 500 ppm | 200 ppm | 200 ppm | 400 ppm |
| 28 | 10 | — | — | — | — | — | — | — | −24 | −27 |
| 29 | 11 | — | — | — | — | — | — | — | −26 | −27 |
| 30 | 12 | — | — | — | — | — | — | — | −23 | −29 |
| 31 | 13 | — | — | — | — | — | — | — | −20 | −27 |

*base CFPP value without additive

The comparison shows that the graft polymers according to the invention have an improved activity compared to the base polymers.

C) Filterability of the Graft Polymers

The filtering properties of the novel graft polymers are compared with the filtering properties of the non-grafted base polymers (Examples 32 to 43) in Table 6. Testing is carried out by the British Rail filtration test, the procedure of which is described below:

400 ppm of a dispersion of the polymer or graft polymer in kerosene (50% by weight of polymer, based on the dispersion) are metered into 200 ml of the corresponding test oil at 20° C. The oil sample is vigorously shaken manually for 30 seconds and kept at +3° C. for 24 hours. A 50 ml sample is then introduced into a test burette which has been cooled to +3° C., and is emptied under the intrinsic hydrostatic pressure over a filter unit fitted with a Whatman glass microfiber filter (type GFA, diameter 2.5 cm). The flow time for a 50 ml volume of oil is measured ($T_1$). This operation is repeated twice more without changing the filter (determination of $T_2$ and $T_3$). The so-called average differential time (ADT), as a measurement value of filterability, is calculated in accordance with the following equation:

$$ADT = \frac{0.5 \times (T_3 - T_1)}{T_2} \times 100$$

Low ADT values correspond to a good filterability.

TABLE 6

| | ADT values of the graft polymers | | |
|---|---|---|---|
| Example No. | MD 6 (3.5)* | MD 7 (0.0)* | MD 8 (0.5)* |
| | Polymer | | |
| 32 | 4 | 35.0 | 28.5 | 65.5 |
| 33 | 5 | — | 21.0 | 45.0 |
| | graft polymer according to Example | | |
| 34 | 4 | 8.5 | — | 8.5 |
| 35 | 5 | 10.2 | — | 10.2 |
| 36 | 6 | 4.9 | — | 4.9 |
| 37 | 7 | — | 8.0 | 8.8 |
| 38 | 8 | — | 8.3 | 37.6 |
| 39 | 9 | — | 10.9 | 14.7 |
| 40 | 10 | — | 7.9 | 29.0 |
| 41 | 11 | — | 13.2 | 18.0 |
| 42 | 12 | — | 8.2 | 35.0 |
| 43 | 13 | — | 5.4 | 7.1 |

*base ADT value without additive

The results of the examples show that the graft polymers according to the invention have a significantly improved filterability compared with the base polymers.

While only a certain number of specific embodiments of the present invention have been expressly described, it is, nonetheless, to be broadly construed and not to be limited except by the character of the claims appended hereto. In the Claims which follow, all percentages are by weight.

What we claim is:

1. A method of improving flow properties of paraffin-containing mineral oils and mineral oil distillates comprising adding to said oils and said distillates a graft polymer of 20% to 99.9% of an ethylene copolymer and 0.1% to 80% of a graft component, said ethylene copolymer comprising 30% to 95% of ethylene and 5% to 70% of vinyl esters of saturated aliphatic $C_2$- to $C_{18}$-monocarboxylic acids or 4% to 50% of vinyl esters of saturated aliphatic $C_2$- to $C_{18}$-monocarboxylic acids and 1% to 20% of linear or branched $C_3$- to $C_{18}$-monoolefins, and said graft component being selected from the group consisting of N-substituted $\alpha,\beta$-unsaturated dicarboxylic acid imides, N-substituted $\alpha,\beta$-unsaturated dicarboxylic acid amides, N-substituted $\alpha,\beta$-unsaturated dicarboxylic acid half-amides, ammonium salts of said half-amides, and mixtures thereof.

2. The method of claim 1 wherein said graft polymer comprises 50% to 99% of said ethylene copolymer and 1% to 50% of said graft component.

3. The method of claim 1 wherein said ethylene copolymer comprises 50% to 80% of ethylene and 20% to 50% of at least one vinyl ester of a saturated aliphatic monocarboxylic acid having 2 to 18 carbon atoms or 15% to 35% of said monocarboxylic acid and 5% to 15% of linear or branched chain monoolefins having 3 to 18 carbon atoms.

4. The method of claim 1 wherein said ethylene copolymer comprises vinyl esters of saturated monocarboxylic acids having 2 to 12 carbon atoms.

5. The method of claim 4 wherein said monocarboxylic acids are selected from the group consisting of acetic acid and neocarboxylic acids having 5 to 10 carbon atoms.

6. The method of claim 1 wherein said ethylene copolymer is an ethylene/vinyl acetate copolymer containing 5% to 50% vinyl acetate.

7. The method of claim 6 wherein said ethylene/vinyl acetate copolymer contains 20% to 40% vinyl acetate.

8. The method of claim 1 wherein said ethylene copolymer is a terpolymer of ethylene, vinyl acetate, and a vinyl ester of a neocarboxylic acid having 5 to 10 carbon atoms.

9. The method of claim 8 wherein said terpolymer comprises 5% to 50% vinyl acetate and 1% to 20% of vinyl neononanoate or vinyl neodecanoate.

10. The method of claim 9 wherein said terpolymer comprises 20% to 35% vinyl acetate and 5% to 15% vinyl neononanoate or vinyl neodecanoate.

11. The method of claim 1 wherein said ethylene copolymer is a terpolymer of ethylene, vinyl acetate, and diisobutylene.

12. The method of claim 11 wherein said terpolymer comprises 4% to 50% vinyl acetate and 1% to 20% diisobutylene.

13. The method of claim 12 wherein said terpolymer comprises 20% to 35% vinyl acetate and 5% to 15% diisobutylene.

14. The method of claim 1 wherein said ethylene copolymer has an average molecular weight of 500 to 30,000.

15. The method of claim 14 wherein said average molecular weight is 8,000 to 30,000.

16. The method of claim 1 which has a melt viscosity, measured at 140° C., of 50 to 500 mPa.s.

17. The method of claim 1 which has a melt flow index, measured at 190° C. under a load of 2.16 kg, of 50 to 5000 g/10 minutes.

18. The method of claim 1 wherein said graft components are selected from the group consisting of N-monosubstituted imides of maleic acid, N-mono- and -disubstituted amides, N-mono- and -disubstituted half amides, and ammonium salts of said half-imides of maleic or fumaric acid.

19. The method of claim 18 wherein said graft component is an n-alkyl maleic acid imide wherein said alkyl has 6 to 24 carbon atoms.

20. The method of claim 1 wherein said graft components are selected from the group consisting of N-monoalkyl, N-monocycloalkyl, N-monoaryl-substituted imides of maleic acid, N-mono- or dialkyl, N-mono- or dicycloalkyl, N-mono- or diaryl, N-alkyl-aryl-substituted-amides, -halfamides, and ammonium salts of said half-amides of maleic acid or fumaric acid.

* * * * *